United States Patent
Wells et al.

(10) Patent No.: US 7,306,299 B2
(45) Date of Patent: Dec. 11, 2007

(54) SEMI-FRAMELESS CABINET AND METHOD FOR MAKING THE SAME

(75) Inventors: Andrew D. Wells, Jasper, IN (US); Wayne Andrew Brinkman, Santa Claus, IN (US); John Bennett Rose, II, Huntingburg, IN (US)

(73) Assignee: MasterBrand Cabinets, Inc., Jasper, IN (US)

( * ) Notice: Subject to any disclaimer, the term of this patent is extended or adjusted under 35 U.S.C. 154(b) by 265 days.

(21) Appl. No.: 10/708,493

(22) Filed: Mar. 8, 2004

(65) Prior Publication Data

US 2004/0189160 A1  Sep. 30, 2004

Related U.S. Application Data

(60) Provisional application No. 60/452,894, filed on Mar. 7, 2003.

(51) Int. Cl.
*A47B 43/00* (2006.01)

(52) U.S. Cl. .................. 312/265.5; 312/257.1

(58) Field of Classification Search ........... 312/257.1, 312/263, 265.5, 265.6, 107, 108, 111, 351; 52/880.11, 800.1, 797.1, 802.1, 716.8; 108/193, 108/149

See application file for complete search history.

(56) References Cited

U.S. PATENT DOCUMENTS

| | | | |
|---|---|---|---|
| 238,452 A | 3/1881 | Sorenson | |
| RE21,825 E * | 6/1941 | Williams et al. | 312/114 |
| 2,360,451 A | 10/1944 | Abraham | |
| 2,874,015 A | 2/1959 | Belden | |
| 2,877,519 A * | 3/1959 | Propst | 217/65 |
| 3,021,187 A * | 2/1962 | Mitchell | 312/263 |
| 3,141,423 A | 7/1964 | Christensen | |
| 3,178,245 A | 4/1965 | Morioka et al. | |
| 3,195,968 A * | 7/1965 | Freeman | 312/263 |
| 3,284,152 A * | 11/1966 | Schorghuber | 312/257.1 |
| 3,301,622 A * | 1/1967 | Zlatko et al. | 312/245 |
| 3,329,473 A * | 7/1967 | Dickson | 312/108 |
| 3,379,483 A | 4/1968 | Oldford | |
| 3,389,666 A | 6/1968 | Heintz Schultz-Bonatz | |
| 3,550,981 A * | 12/1970 | Cohen | 312/198 |
| 3,713,718 A * | 1/1973 | Lucci | 312/263 |
| 3,743,373 A * | 7/1973 | Camper et al. | 312/265.1 |
| 3,748,009 A | 7/1973 | Stone | |
| 3,749,465 A * | 7/1973 | Newcomer | 312/245 |
| 3,754,806 A | 8/1973 | Nakagawa | |
| 3,784,273 A | 1/1974 | Nikolai | |
| 3,807,102 A * | 4/1974 | Albinson et al. | 52/36.1 |
| 3,853,367 A * | 12/1974 | Jamison et al. | 312/259 |
| 3,961,456 A * | 6/1976 | Manlove et al. | 52/717.03 |
| 4,691,644 A | 9/1987 | Frydman | |

(Continued)

*Primary Examiner*—Janet M. Wilkens
(74) *Attorney, Agent, or Firm*—Calfee, Halter & Griswold LLP

(57) ABSTRACT

A semi-frameless cabinet system including a top panel, bottom panel, two side panels, and a back panel. The cabinet may also include one or more middle shelves, drawers, or doors. Each of the forward facing sides of the cabinet include a grooved surface, wherein edging is secured to each panels such that the panels and edging form an interior space within the cabinet. The edging overlaps the outer edge of the cabinet panels, but not the inner edge, such that the edging and panels are flush within the interior space of the cabinet. As such, the cabinet employs the advantages of both framed and frameless cabinets.

20 Claims, 5 Drawing Sheets

U.S. PATENT DOCUMENTS

| | | | |
|---|---|---|---|
| 4,748,780 A * | 6/1988 | Vinther | 52/309.3 |
| 4,758,056 A * | 7/1988 | Buck et al. | 312/263 |
| D298,887 S | 12/1988 | Irace | |
| D300,481 S | 4/1989 | Irace | |
| 5,100,216 A * | 3/1992 | Enns | 312/263 |
| 5,590,939 A | 1/1997 | Piontek | |
| 6,179,398 B1 | 1/2001 | Martin | |
| 6,428,127 B1 | 8/2002 | Rasmussen | |
| 6,516,955 B1 | 2/2003 | Dudhwala et al. | |
| 2002/0121387 A1 | 9/2002 | Suzuki et al. | |
| 2003/0155847 A1 | 8/2003 | Henkel | |

* cited by examiner

SEMI-FRAMELESS CABINET AND METHOD FOR MAKING THE SAME

CROSS REFERENCE TO RELATED APPLICATIONS

This application claims the benefit of U.S. Provisional Application Ser. No. 60/452,894 filed Mar. 7, 2003, the entire disclosure of which is hereby incorporated by reference.

BACKGROUND OF INVENTION

The invention relates to a cabinet and a method for making a cabinet, and more specifically to a semi-frameless cabinet and method of making a semi-frameless cabinet.

In general, there are two styles of cabinets made throughout the world, framed cabinets and frameless cabinets.

Framed cabinets have been the preferred style in North America, while the frameless style has been more predominant in Europe. The main difference between the two types of cabinets is the framed surface of the cabinets. In a framed-style cabinet, a framed surface surrounds the cabinet doors. This frame overlaps with the entry space to the cabinet, thereby decreasing the access space to the cabinet. This can provide for reduced access to the cabinet for the end user and can be cumbersome to the manufacturer or installer when installing the cabinet hardware.

With the frameless design, there is no overlap with the cabinet interior opening, and thus access to the cabinet interior is unrestricted. In addition, since the cabinet doors are placed directly on the sides of the cabinet, as opposed to the frame or positioned behind the frame, shorter hinges and drawer guides, which are easier to install, can be used. One disadvantage of the frameless-style cabinets is the lack of acceptance by those who install the cabinets. This is mainly due to the fact that frameless cabinets do not have overhang and are fairly rigid in their construction, thereby providing the installer with very little scribe, or slack, wherein the cabinet can be manipulated to conform to the surface to which it is applied. In addition, due to the lack of a supportive frame structure, frameless cabinets must be built in a more sturdy configuration, thereby necessitating a heavier cabinet.

As such, it is desirable to provide a cabinet that encompasses all of the advantages of both types of cabinets. It is also desirable to produce such cabinets in an improved and efficient manner.

SUMMARY OF INVENTION

A new and improved cabinet and style of making and installing a cabinet is provided that includes the advantages of both frameless and framed cabinets. In one embodiment, the cabinet includes a top panel, bottom panel, two side panels and a back panel. Each of the panels is connected together to form the structure of the cabinet. The face of each cabinet structure includes a front opening into the interior of the cabinet. Each of the front facing sides of the panels are provided with and include a groove, where an edging can be secured. The edging or edge material substantially surrounds the face or outer surface of the cabinet structure but does not extend into the front opening of the cabinet or into the interior of the cabinet structure.

Another aspect of the present cabinet is that the method for making the cabinet includes the advantages of both frameless and framed cabinets. In one embodiment of the method, cabinet panels are cut from a single piece of material. At least one side of each of the cabinet panels that will have front exposure once the cabinet is assembled, or form the face of the cabinet structure, are then grooved and the edging is secured by conventional methods over the grooved side of each of the panels. The panels are then assembled to form a semi-frameless cabinet.

BRIEF DESCRIPTION OF DRAWINGS

The semi-frameless cabinet of the present invention may be more readily understood by reference to the following drawings. While certain embodiments are shown as illustrative examples of the semi-frameless cabinet, the scope of this application should not be construed as limited to these illustrative examples.

DETAILED DESCRIPTION

The present application provides an improved cabinet or cabinet system and method of making the same. The improved cabinet system encompasses the advantages of both framed and frameless cabinets. Such advantages include, but are not limited to, an overhang along the outer surface of the cabinet edge members, an edge that does not protrude into the cabinet opening, and a construction that allows the cabinet to have some scribe during installation. In addition, the improved cabinet system provides for an improved method of manufacture, which reduces the labor and required assembly space.

Figure 1:
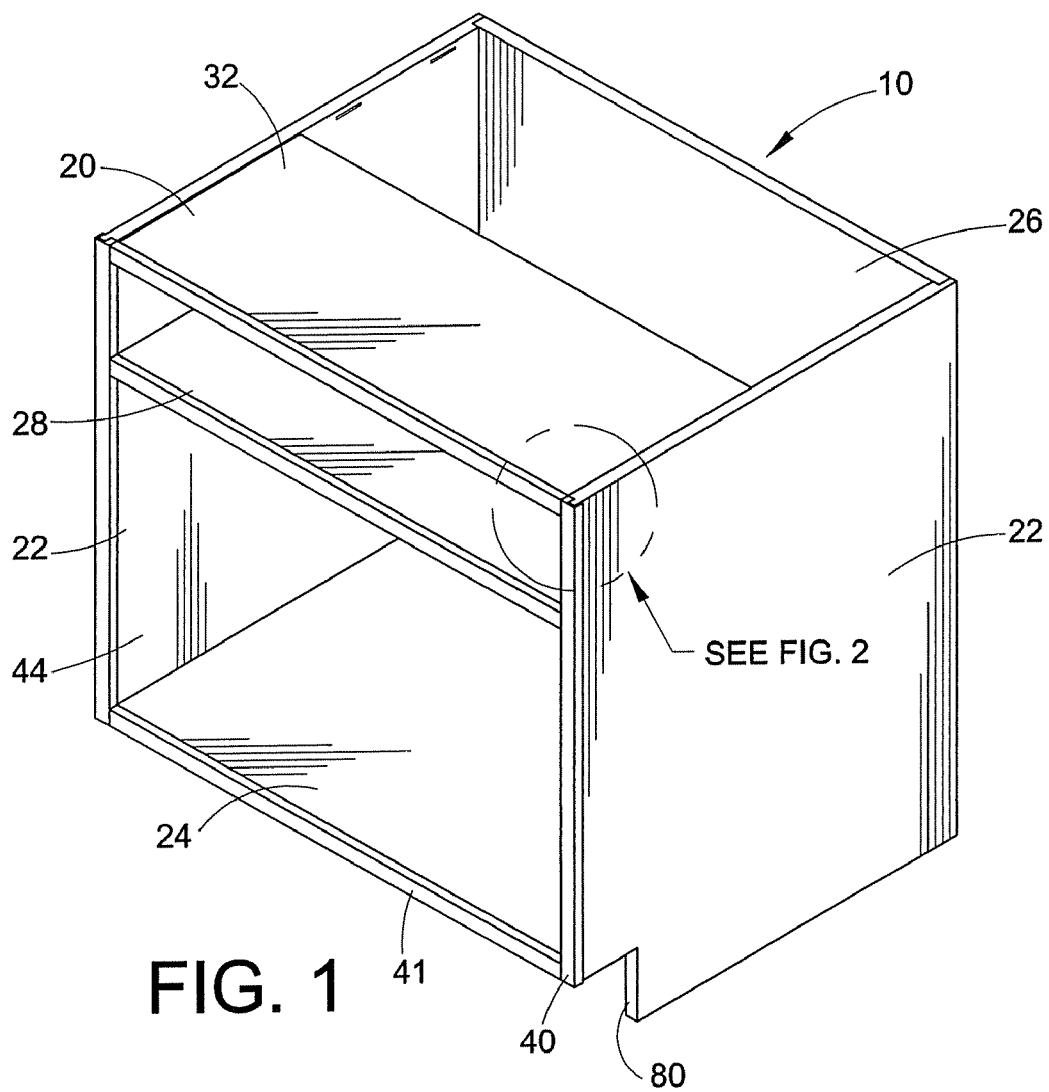
FIG. 1 is a perspective view of the semi-frameless base cabinet of the present invention with an integrated toe kick in the side panels.
Figure 2:
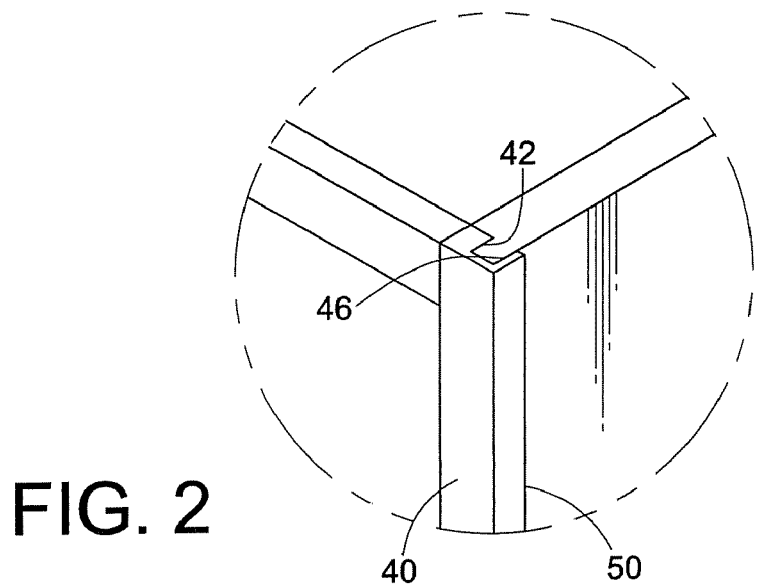
FIG. 2 is an expanded view of the edging material that surrounds the face or outer surface of the cabinet structure.
Figure 4:
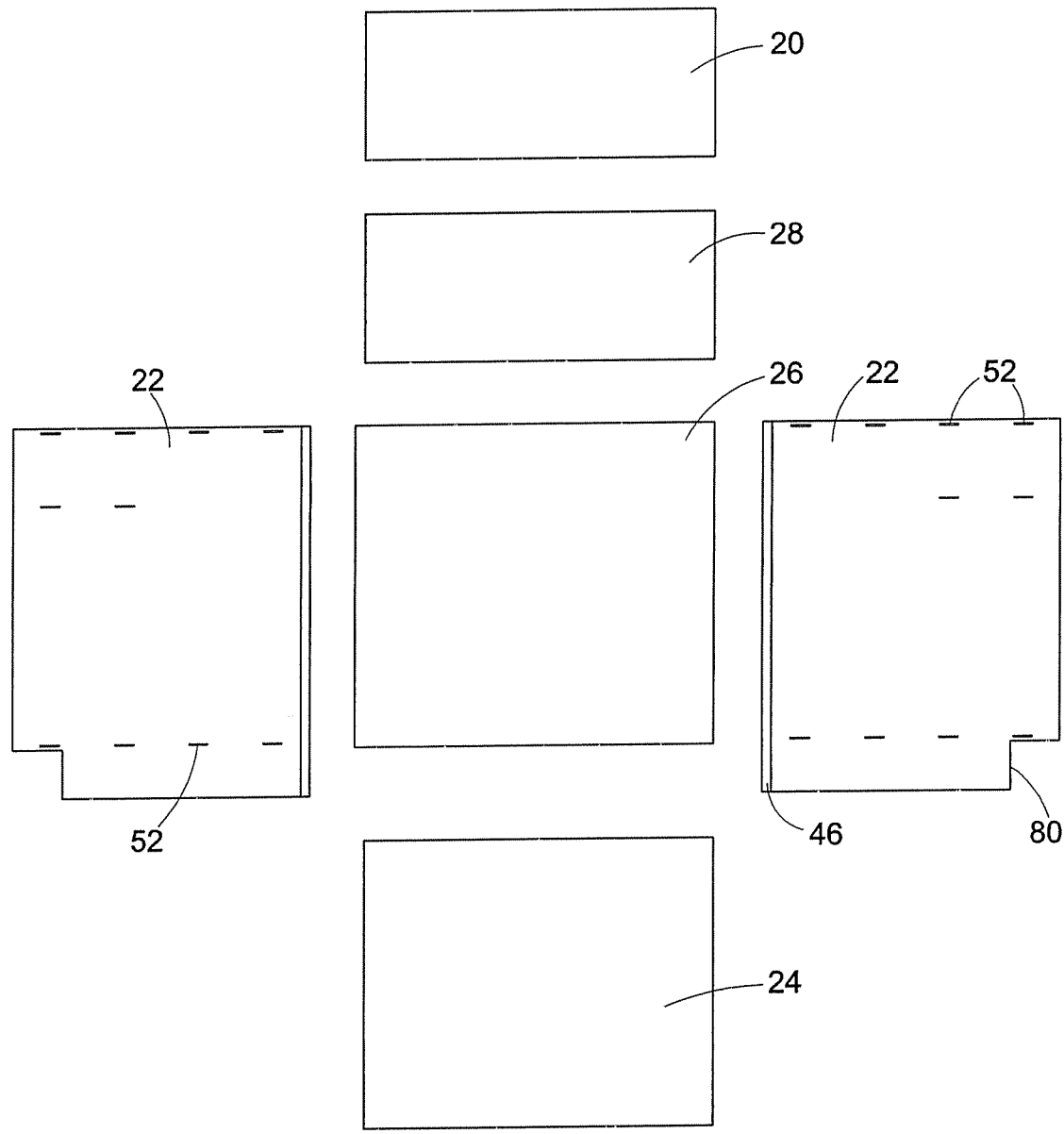
FIG. 4 is a view of the material components that make up a cabinet structure.
Figure 5:
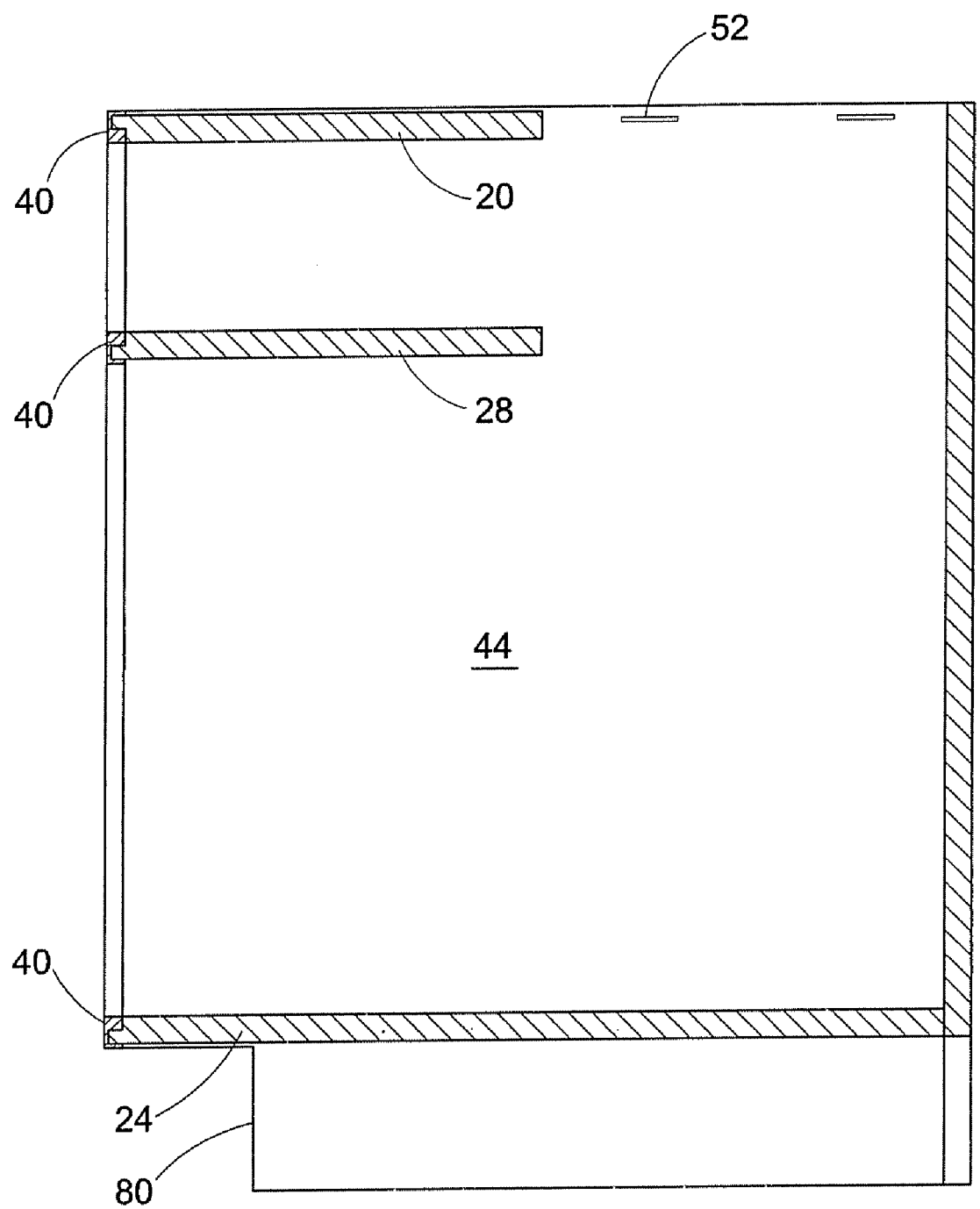
FIG. 5 is a cross-sectional view of the cabinet in FIG. 1.

The improved cabinet system generally comprises one or more semi-frameless cabinets 10 made in accordance with the method described herein. The semi-frameless cabinet 10 generally includes a top panel 20, two side panels 22, a bottom panel 24, and a back panel 26. In addition, one or more middle shelves 28 may be included, thereby allowing for the construction of drawer space. Furthermore, one or more of these panels can be excluded providing that it is not needed or desired in the overall end product. As best illustrated in FIG. 4, each of these panels can be cut from a single piece of material by properly dimensioning the cut length. FIG. 1 illustrates an assembled base cabinet 10. One or more cross-members (not shown) may be included to divide the cabinet into two sections, however it is preferable to simply dimension the cabinet smaller and attach multiple cabinets together. For example, it is preferred to dimension the cabinets either 24 inches or 12 inches in width. In general, 24 inch cabinets are used as base cabinets, while 12 inch cabinets are used as wall cabinets. If it is desirable to spilt the 24 inch cabinet, it is preferable to attach two 12 inch cabinets together.

An edge 40 creates the frame-like appearance around the face 41 of the cabinet 10. The edge 40 is attached to a side of each of front-accessible cabinet structural pieces, namely the top panel 20, two side panels 22, the bottom panel 24, and middle shelves 28. The top surface 20 may either be a complete piece covering the entire top of the cabinet 32, or, as shown in FIG. 1, it may be less than the full dimension of the top of the cabinet. Preferably one side of each of cabinet structural pieces has a groove 42 placed on the interior surface 44. The edge 40 is made with a corresponding groove 46 which is dimensioned such that the edge can be placed over the side of the cabinet structural piece that has groove 42. In one embodiment, the groove 42 is created in the center of the edge 40, thereby creating a U-shaped edge. However, one skilled in the art should appreciate that other configurations for the edge can be employed. When so applied, the edge 40 lies flush with the interior surface 44 of the cabinet structural piece and creates an overhang 50 similar to a framed cabinet. Preferably the overhang 50 is about 3/16 inch, however the overhang may be in the range of about 0.125 inch to about 0.5 inch.

Upon assembly of the cabinet structural pieces, the side pieces 22, typically, have grooves 52 along the interior surface 44, while the cross pieces, namely the top 20, the bottom 24 and middle shelves 28 include grooves along the sides. The grooves 52 can be a series of separated grooves that use biscuit (or Lamello) or rod joints 60 to attach two panels together, or can be continuous along the greater portion of the common length and attached using a spline (not shown). The back surface 26 is attached in a similar fashion, wherein the grooves 52 are located along the back interior surface 44 and the side of the bottom surface 24. Other assembly techniques may be employed, such as, for example, screws or bolts.

Once the cabinets 10 are assembled, hardware can be added. Since the edge 40 is flush with the interior surfaces 44, hinges and drawer rollers can be mounted directly on the interior surface 44 of the side panels 22. As such, the hardware installed is easier to install and less cumbersome once installed. For example, drawer rollers used in framed cabinets typically need to run the entire length of the cabinet and then be secured by screws, or bolts, through the back panel 26 of the cabinet.

When constructing the cabinets 10, an improved method can be used wherein the cabinets can be made in a more efficient manner. In addition less floor space is required in the manufacturing facility to construct the present cabinet system. Instead of storing panels of various shapes and sizes required to manufacture framed cabinets, only three different pieces are required, as described below.

Figure 3:
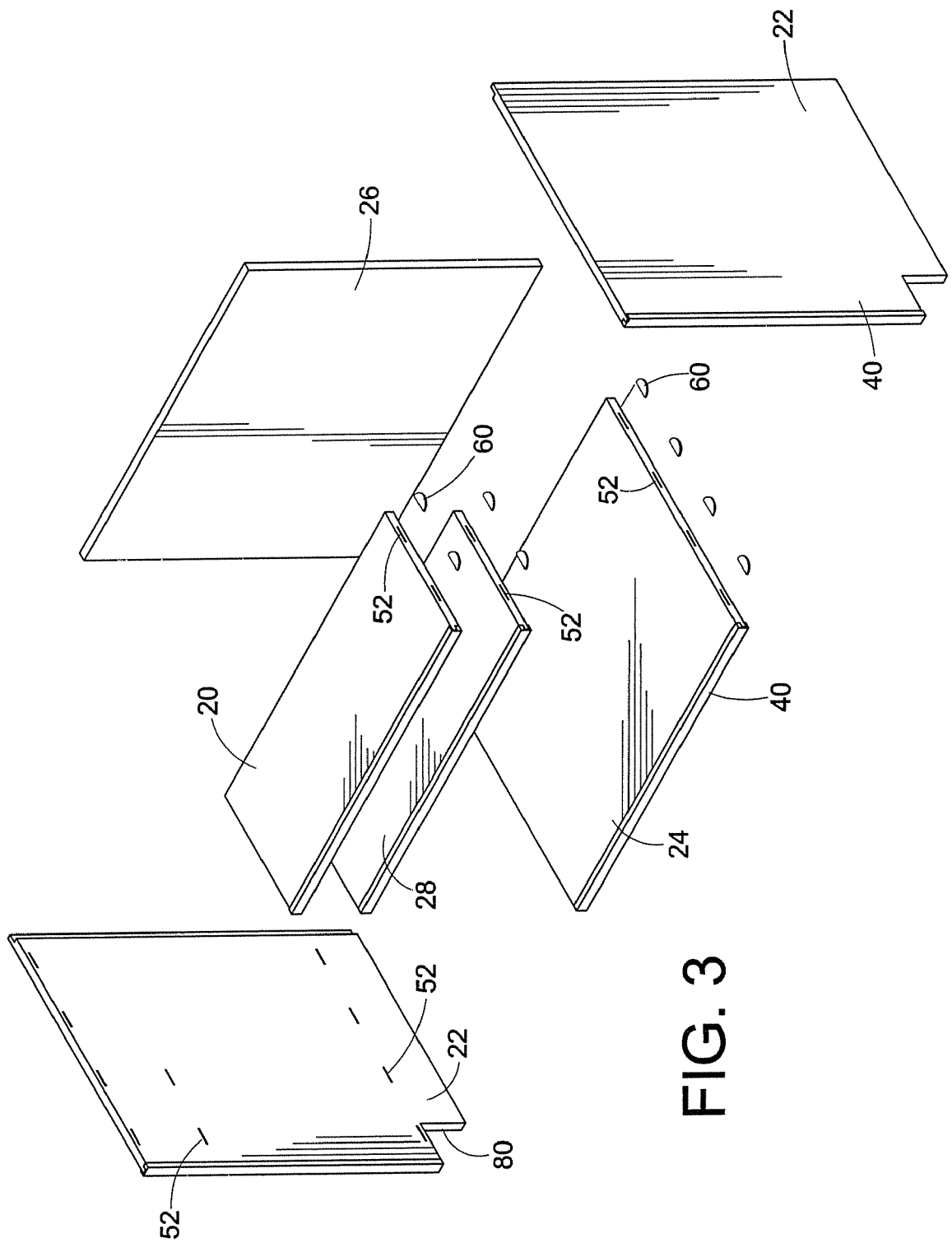
FIG. 3 is an exploded view of the cabinet shown in FIG. 1.
Figure 6:
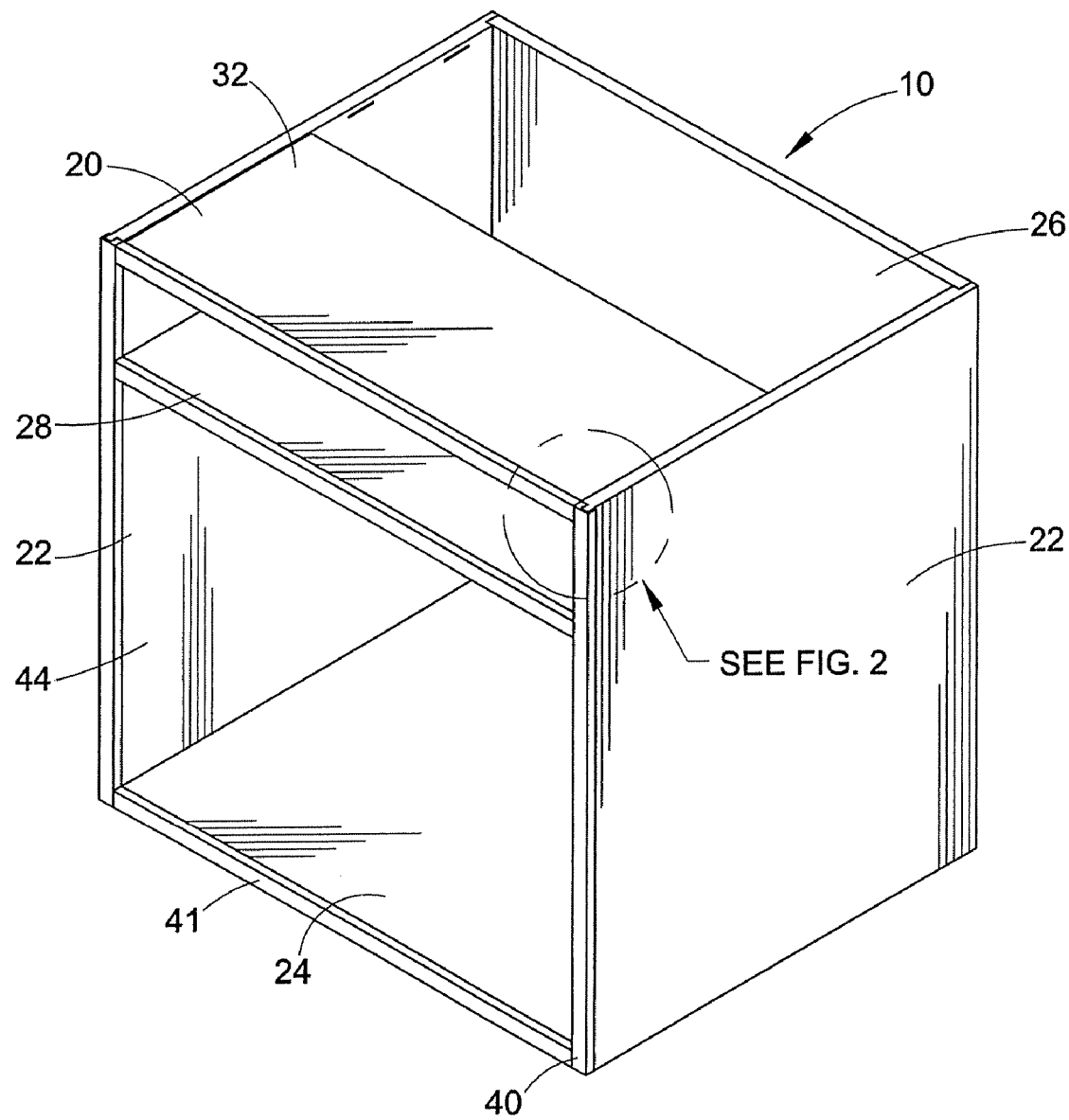
FIG. 6 is another embodiment of the base cabinet of the present invention where the toe kick area is not integrated into the side panels of the cabinet.

A single piece of material, such as, for example, wood, can be used to create each of the panel members. Preferably a 24 inch or 12 inch piece is processed and cut to form a top panel 20, bottom panel 24, two side panels 22, a back panel 26 and one or more mid shelves 28. As shown in FIGS. 3 and 4, the side panels 22 can also be cut to create the recessed support, or toe kick, 80. In other embodiments, such as the one shown in FIG. 6, the bottom panel 24 can meet squarely with the side panels 22 and the toe kick (not shown), if desired, can be added as a separate, stand-alone piece. In addition, multiple units can be cut simultaneously. For example, if 12 inch cabinet units are desired, each of the panels can be cut from a 24 inch board, then split down the middle. This will allow more units to be cut in a shorter amount of time. Each of the panels can then be aligned and run through a grooving machine to create a grooved side 42 for placement of edge 40. Optionally, panels that will be cut in half to make two panels can be grooved prior to cutting, thereby allowing the grooving on both sides of the uncut cabinet material. Edge 40, which may be stored with groove 46 precut, can then be applied over the grooved side 42 of each of the panels. The edge 40 may be held in place by glue, adhesive or some other conventional technique. Each of the panels are then drilled and prepared for assembly. The drilling step includes the creation of grooves 52 wherein biscuit joints 60 will join the panels. Optionally, drill holes (not shown) can be created along the interior surface of the side panels 22 to allow for adjustable shelving to be placed at various heights. Hardware such as handles, drawer guides, and hinges, for example, can be secured to the cabinet either before, or preferably, after assembly. The cabinet panels are brought into position of assembly and biscuit joints, dowel rods or a spline is placed in the corresponding grooves 52 of two panels that are to be connected. The biscuit joints are secured by glue, adhesive, or some other conventional technique.

What has been described above includes several embodiments. It is, of course, not possible to describe every conceivable combination of components or methodologies for purposes of describing the systems and methods and so on employed in the manufacture of cabinets. One of ordinary skill in the art may recognize that further combinations and permutations are possible. This application is intended to embrace alterations, modifications, and variations that fall within the scope of the appended claims. Furthermore, the preceding description is not meant to limit the scope of the invention, and it is not limited to the specific details, the representative apparatus, and illustrative examples shown and described. Accordingly, departures may be made from such details without departing from the spirit or scope of the applicant's general inventive concept. The scope of the invention is to be determined only by the appended claims and their equivalents.

The invention claimed is:

1. A cabinet comprising:
   a top panel, bottom panel, two side panels, and a back panel, each of said panels having an inner and an outer surface; wherein the inner surface of the panels face an interior cavity of the cabinet and the outer surface of the panels form an exterior surface of the cabinet and wherein at least one of said top, side, and bottom panels include a groove on an inner portion of a front edge that is placed where the panel inner surface meets the front edge of the panel to leave a front edge remainder portion, and wherein an outer surface of said at least one of said top, side, and bottom panels that includes said grooved inner portion is un-grooved along substantially an entirety of said front edge;
   generally U-shaped edging material having first and second legs connected by a middle portion, wherein an interior surface of the first leg is engaged with the groove of the at least one of said top, side and bottom panels and the middle portion spans the front edge remainder portion, and an interior surface of the second leg abuts the un-grooved outer surface of the panel; and
   wherein a terminating end of the second leg extends beyond the outer surface of the panel and at an angle to the outer surface to form an overhang with respect to the exterior surface of the cabinet and wherein an outer surface of the first leg is substantially flush with the inner surface of said at least one panel.

2. The cabinet of claim 1, wherein said overhang extends between about 0.125 inch and about 0.5 inch beyond said at least one panel.

3. The cabinet of claim 1 further comprising one or more middle shelves.

4. The cabinet of claim 3, wherein said middle shelves include a grooved side and edging secured thereto.

5. The cabinet of claim 1 further comprising cabinet hardware mounted flush against the inner surface of said side panels.

6. The cabinet of claim 1 wherein the angle between the termination end of the second leg and the outer surface of the cabinet is approximately ninety degrees.

7. The cabinet of claim 1 wherein the second leg is narrower than the first leg.

8. The cabinet of claim 1 wherein the second leg has a substantially flat exterior surface.

9. The cabinet of claim 1 wherein the first and second legs have approximately equal lengths.

10. The cabinet of claim 1 wherein the interior surface of the first and second legs is generally planar and parallel to the outer surface.

11. The cabinet of claim 1 wherein the groove has a generally rectangular shape including a groove side edge that is generally parallel to the outer surface and a groove rear edge that is generally perpendicular to the outer surface.

12. A cabinet comprising:
   a set of cabinet panels that form the structure of a cabinet; and
   U-shaped edging secured to a side of one or more of said panels, the edging having first and second legs connected by a middle portion, wherein the first leg engages an interior front edge groove in the one or more of said panels and wherein substantially an entirety of a termination end of the second leg extends beyond the structure of the cabinet at an angle to an exterior surface of the cabinet and,
   wherein an exterior surface of said one or more of said panels that includes said front edge groove is ungrooved along substantially an entirety of said front edge and further wherein said cabinet structure has slack such as to allow the structure of the cabinet to be manipulated to conform to the surface on which the cabinet is to be mounted.

13. The cabinet of claim 12 wherein the edging forms a front face of the cabinet structure, wherein said front face is flush with the interior surfaces of said cabinet panels.

14. The cabinet of claim 12 further comprising cabinet hardware mounted flush against one or more inner surface of said set of cabinet panels.

15. The cabinet of claim 12 wherein the angle between the termination end of the second leg and the outer surface of the cabinet is approximately ninety degrees.

16. The cabinet of claim 12 wherein the second leg is narrower than the first leg.

17. The cabinet of claim 12 wherein the second leg has a substantially flat exterior surface.

18. The cabinet of claim 12 wherein the first and second legs have approximately equal lengths.

19. The cabinet of claim 12 wherein the interior front edge groove has a generally rectangular shape including a groove side edge that is generally parallel to the exterior surface of the cabinet and a groove rear edge that is generally perpendicular to the exterior surface of the cabinet.

20. The cabinet of claim 12 wherein an interior surface of the first and second legs is generally planar and parallel to the exterior surface of the cabinet.

* * * * *